US008155160B2

(12) United States Patent
Herden et al.

(10) Patent No.: US 8,155,160 B2
(45) Date of Patent: Apr. 10, 2012

(54) METHOD AND DEVICE FOR IGNITING A FUEL-AIR MIXTURE IN A COMBUSTION CHAMBER OF AN INTERNAL COMBUSTION ENGINE

(75) Inventors: Werner Herden, Gerlingen (DE); Martin Weinrotter, Stuttgart-Botnang (DE); Heiko Ridderbusch, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 585 days.

(21) Appl. No.: 12/258,144

(22) Filed: Oct. 24, 2008

(65) Prior Publication Data

US 2009/0120395 A1 May 14, 2009

(30) Foreign Application Priority Data

Nov. 9, 2007 (DE) ......................... 10 2007 053 414

(51) Int. Cl.
*H01S 3/13* (2006.01)

(52) U.S. Cl. ................. 372/30; 372/10; 372/41; 372/69

(58) Field of Classification Search .................... 372/10, 372/30, 41
See application file for complete search history.

(56) References Cited

U.S. PATENT DOCUMENTS 5,756,924 A * 5/1998 Early ............................ 102/201

* cited by examiner

*Primary Examiner* — Dung Nguyen
(74) *Attorney, Agent, or Firm* — Kenyon & Kenyon LLP

(57) ABSTRACT

A device is provided for igniting a fuel-air mixture in a combustion chamber of an internal combustion engine with the aid of electromagnetic radiation, in particular light. The device includes at least two laser radiation sources, each having an optical resonator. The resonators are spatially oriented with respect to one another in such a way that modes of the laser radiation sources are coupled to one another and are able to generate time-shifted pulses of the electromagnetic radiation.

8 Claims, 6 Drawing Sheets

METHOD AND DEVICE FOR IGNITING A FUEL-AIR MIXTURE IN A COMBUSTION CHAMBER OF AN INTERNAL COMBUSTION ENGINE

RELATED APPLICATION INFORMATION

The present application claims priority to and the benefit of German patent application no. 10 2007 053414.2, which was filed in Germany on Nov. 9, 2007, the disclosure of which is incorporated herein by reference.

FIELD OF THE INVENTION

The present invention relates to a method, a device, the use of the device, and a computer program for igniting a fuel-air mixture in a combustion chamber of an internal combustion engine with the aid of electromagnetic radiation.

BACKGROUND INFORMATION

In addition to the ignition of a fuel-air mixture with the aid of an electrically generated ignition spark, ignition based on a laser is currently being investigated. Such an operating method and a device for carrying out the method are discussed in U.S. Pat. No. 5,756,924. Laser radiation is used to generate a plasma in the combustion chamber of the internal combustion engine which initiates the combustion process for the fuel-air mixture. To generate the plasma, a so-called breakthrough intensity, between $10^{-10}$ and $10^{-12}$ W/cm$^2$, of the introduced radiation must be exceeded. The gas forms an optically dense plasma in the region, which then absorbs additional laser radiation. When this breakthrough intensity is exceeded, a plasma is formed which is further heated by the radiation.

A disadvantage of the related art is that a relatively large amount of energy in the form of laser radiation must be expended before the breakthrough intensity is reached.

SUMMARY OF THE INVENTION

An object of the present invention, therefore, is to make more efficient use of the introduced energy of the laser radiation for igniting the fuel-air mixture.

This object is achieved using a device for igniting a fuel-air mixture in a combustion chamber of an internal combustion engine with the aid of electromagnetic radiation, in particular light, the device including at least two laser radiation sources, each having an optical resonator, the resonators being spatially oriented with respect to one another in such a way that modes of the laser radiation sources are coupled to one another and are able to generate time-shifted pulses of the electromagnetic radiation. The coupling of the resonators is such that the laser pulses generated from the two resonators are time-shifted with respect to one another. The optical resonators (laser crystals) which may be provided in a single laser crystal (solid-state laser monolith) or in laser crystals which are separated by a distance. In both embodiments at least a slight coupling of the laser modes occurs so that time-shifted laser pulses may be generated.

Two or more passively Q-switched solid-state laser monoliths which may be optically pumped by a pump fiber. An optical system for shaping the pump radiation may also be used between the pump fiber and the solid-state monolith. The pumping process is initiated at the same time, for example by a pump source (laser diode), the pump diode radiation being distributed over two or more fiber bundles using a fiber array, for example. As the result of statistic effects the solid-state monoliths should be induced to slight oscillation at different times, resulting in emission of one laser pulse from each laser monolith with a time difference of 1 ns minimum and 1 μs maximum, which may be between 10 ns and 200 ns. Using a subsequent focusing device, the laser pulses are then focused on a common focal point and an ignition plasma is generated.

The optical resonators (laser crystals) which may be situated in a single solid-state laser monolith which is produced, for example, as one piece. The optical resonators are connected either to separate pump units or to a shared pump unit. In this manner two or more spatially independent laser modes are formed in the laser resonator which have a slight coupling and which thus form laser pulses which have a time difference. The time interval between the two pulses is 1 ns minimum and 1 μs maximum, which may be 10 ns to 200 ns.

In a further specific embodiment it is provided that a screen is situated between the optical resonators. In this design an opaque screen is inserted into the laser monolith. In this manner two spatially separated laser modes are generated from the resulting laser mode, resulting in a time interval of 1 ns minimum and 1 μs maximum, which may be 10 ns to 200 ns. Using a final lens, the laser beams are focused once again on a common focal point and generate an ignition plasma.

Either all resonators are provided with Q-switches or only one of the optical resonators is provided with a Q-switch. For the resonator without a Q-switch, continuous-wave laser radiation is formed which is used to heat the plasma formed by the other resonator using a short pulse which is above the breakthrough intensity.

The radiation from the laser radiation sources may be focused on a point using an optical element, in particular a lens or a system of multiple lenses. The focusing lens is situated in the beam paths of both radiation sources, and focuses their radiation on a focal point.

The object mentioned at the outset is also achieved using a device for igniting a fuel-air mixture in a combustion chamber of an internal combustion engine using electromagnetic radiation, in particular light, the device including at least one optical resonator which is provided with a Q-switch, the Q-switch letting through, at least in some ranges, components of the pump radiation. Thus, the device on the one hand lets through portions of the pump radiation, and on the other hand delivers these laser pulses. The latter function is used to generate a plasma, and the former function is used to heat the plasma.

The Q-switch may have at least one through opening which lets through the portions of the pump radiation. Using simple measures it is thus possible to let through the pump radiation and generate the laser pulses. The radiation from the laser radiation sources as well as the pump radiation which passes through are focused on a point using the optical element, which may be a lens or a system of multiple lenses.

The object mentioned at the outset is also achieved using a method for igniting a fuel-air mixture in a combustion chamber of an internal combustion engine using electromagnetic radiation which is generated by at least one radiation source associated with the combustion chamber, initially a first pulse of the electromagnetic radiation having an intensity which is above a breakthrough intensity being injected into the combustion chamber, and then at least one additional pulse of the electromagnetic radiation being injected into the combustion chamber.

After the first pulse, a pulse sequence in which at least a portion of the pulses have an intensity which is above the breakthrough intensity which may be injected into the combustion chamber. Alternatively, after the first pulse, a pulse sequence in which each pulse has an intensity which is below the breakthrough intensity is injected into the combustion chamber. The intensity above the breakthrough intensity allows the formation of additional plasma, and an intensity below the breakthrough intensity is used only for heating the plasma that is already present.

In a further alternative, after the first pulse at least one continuous pulse is injected into the combustion chamber. It may be provided that the continuous pulse has an intensity which is below the breakthrough intensity.

A time interval of 1 ns to 1 μs, and particularly may be between 10 ns and 200 ns, may be present between the pulses.

The object mentioned at the outset is also achieved using a method for igniting a fuel-air mixture in a combustion chamber of an internal combustion engine using electromagnetic radiation which is generated by at least one radiation source associated with the combustion chamber, characterized in that initially, a first pulse of the electromagnetic radiation having a maximum intensity which is above a breakthrough intensity is injected into the combustion chamber, and in parallel at least one continuous electromagnetic radiation is injected into the combustion chamber.

The continuous electromagnetic radiation may be pump radiation for the radiation source for generating the first pulse.

The object mentioned at the outset is also achieved using an internal combustion engine having a device according to the present invention, and a computer program containing program code for carrying out all the steps using a method according to the present invention when the program is executed in a computer.

One exemplary embodiment of the present invention is explained in greater detail below with reference to the accompanying drawings.

DETAILED DESCRIPTION

The following discussion is directed to an internal combustion engine which as a piston engine has at least one combustion chamber in which a unit for generating electromagnetic radiation, which may be a laser, is provided in such a way that a fuel-air mixture in the combustion chamber may be irradiated with the laser light and brought to ignition. The laser may be provided in addition to a conventional spark plug, or may replace the spark plug. The internal combustion engine may be a two-stroke as well as a four-stroke spark ignition engine. The novel ignition system may also be used for turbines.

Figure 1:
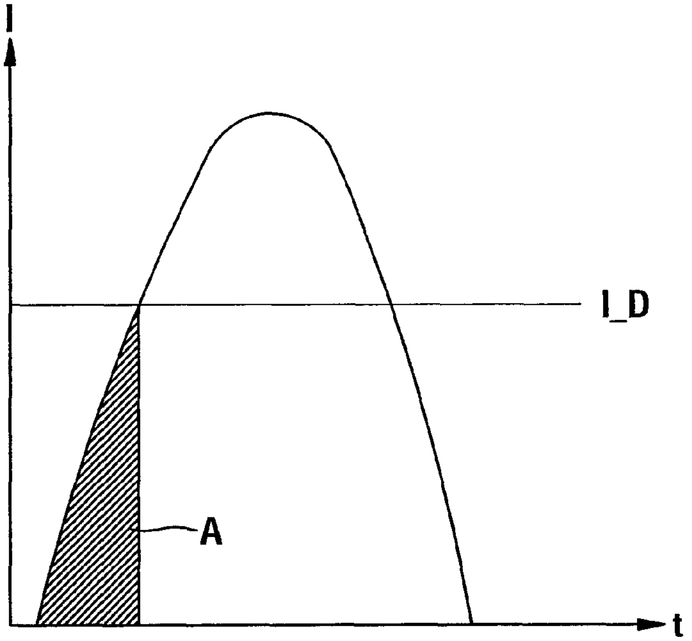
FIG. 1 shows a diagram of the radiation intensity over time of a laser for igniting a fuel-air mixture in a combustion chamber.

For ignition of a fuel-air mixture in the combustion chamber with the aid of a laser beam, first a plasma is generated which initiates the combustion of the fuel-air mixture. FIG. 1 shows a diagram of radiation intensity I over time t of a laser for igniting a fuel-air mixture in the combustion chamber. A plasma is generated when intensity I is above a breakthrough intensity I_D. In the method according to the related art, a single pulse is generated which exceeds breakthrough intensity I_D and heats the plasma sufficiently for initiating the combustion process. In the single-pulse ignition according to FIG. 1, the entire ignition energy is introduced into the combustion chamber in one pulse. However, since the plasma is not formed until a breakthrough intensity I_D is reached, the portion of energy is lost prior to reaching breakthrough intensity I_D.

Figure 2:
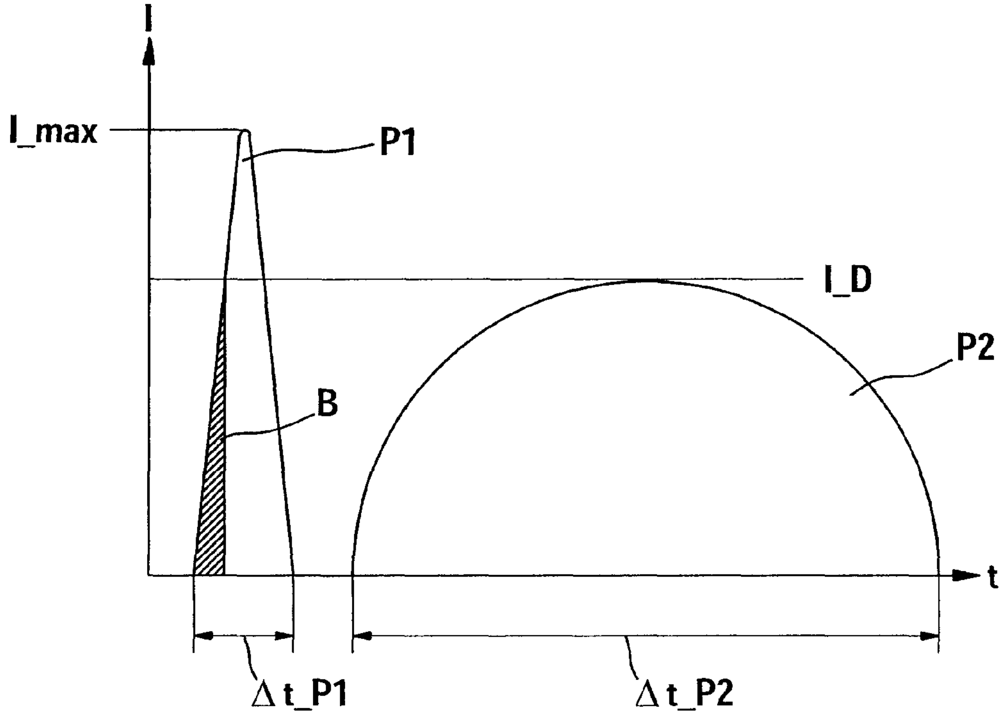
FIG. 2 shows a diagram of the radiation intensity over time for a first exemplary embodiment of a pulse sequence according to the present invention.

FIG. 2 shows a diagram of intensity I over time t corresponding to the illustration of FIG. 1 for one exemplary embodiment of a pulse sequence according to the present invention. In this case, first a short pulse which exceeds breakthrough intensity I_D is transmitted, and then a longer pulse or a pulse sequence of multiple pulses, which do not have to exceed breakthrough intensity I_D, is/are transmitted for further heating of the plasma. The energy expended until the breakthrough intensity is reached is the integral of intensity I over time t, which in FIG. 1 is identified by the letter A and in FIG. 2 by the letter B and is illustrated as a crosshatched area. It is shown that the energy to be expended (and thus "lost") for the pulse according to FIG. 1 is greater than that for the pulse according to FIG. 2. The previously described negative effect of a single pulse may be counteracted by a multipulse ignition. The plasma is formed in a first low-energy but very short pulse in the range of one nanosecond or less having a high peak intensity I_Max, and is heated by a second laser pulse or multiple laser pulses which no longer have to be above breakthrough intensity I_D. For the first low-energy, short pulse less energy is lost as the result of the steeper leading edge, as illustrated by area B in FIG. 2, until breakthrough intensity I_D has been reached. A first small amount of plasma is thus formed which is then heated more efficiently by a second laser pulse or multiple laser pulses, thereby increasing the overall ignition efficiency.

Figure 3:
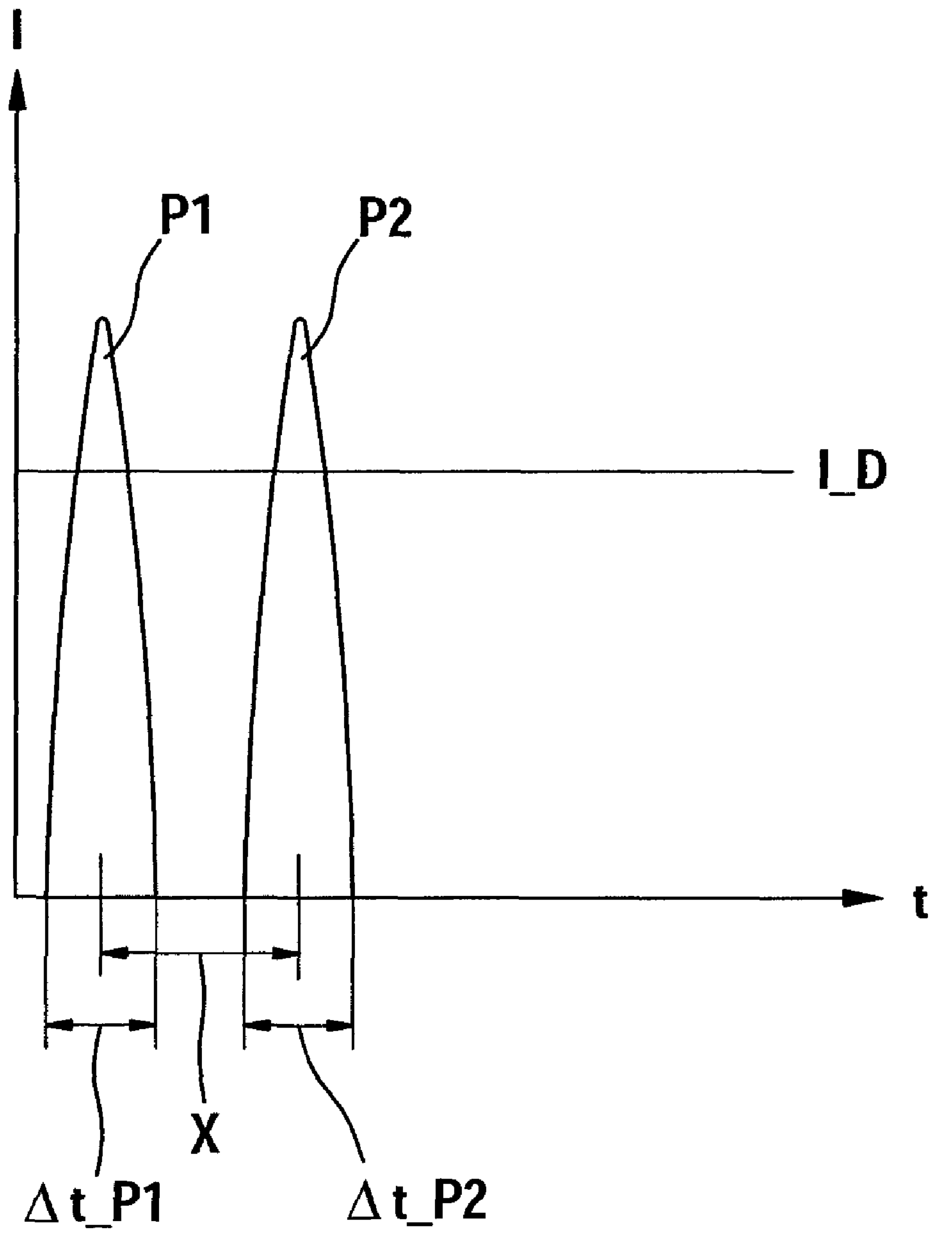
FIG. 3 shows a diagram of the radiation intensity over time for a second exemplary embodiment of a pulse sequence according to the present invention.

However, in one alternative specific embodiment of the method according to the present invention the pulses may also have equal pulse durations and energies, as illustrated in FIG. 3. The energies of the pulses are designated in FIGS. 2 and 3 as P1 and P2, and the pulse durations are designated as delta t_P1, delta t_P2, and the like. The laser pulses may be different. The interval between the individual pulses, which is designated by X in FIG. 3, is between one nanosecond (ns) and 1 microsecond (μs), in particular between 10 nanoseconds and 200 nanoseconds.

Figure 4A:
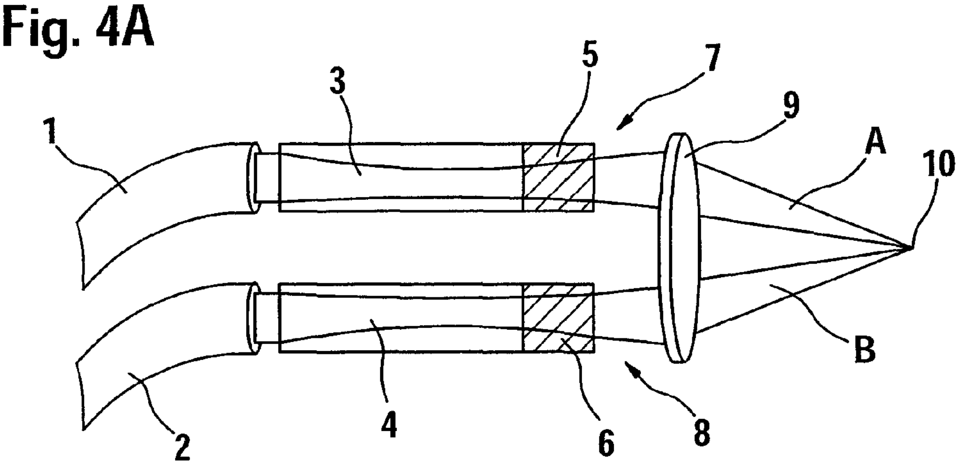
FIGS. 4*a*, 4*b* and 4*c* show exemplary embodiments of laser radiation sources according to the present invention.
Figure 4B:
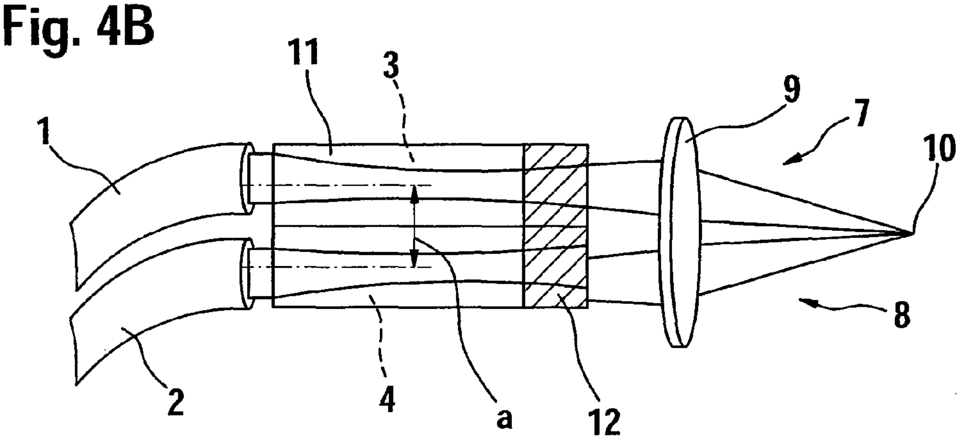

FIG. 4 shows various exemplary embodiments of laser radiation sources for generating time-shifted laser pulses. The beam paths, the same as in the subsequent drawings, are illustrated by crosshatched areas A, B and by lines. FIG. 4 illustrates a system in which the two pump fibers, designated by reference numerals 1 and 2, each optically pump one laser crystal associated with one of the pump fibers. A laser crystal 3 as an optical resonator is associated with pump fiber 1, and a laser crystal 4 as an optical resonator is associated with pump fiber 2. Laser crystals 3 and 4 are each Nd:YAG laser crystals and are each provided with a CR4+ Q-switch. Alternatively, any other known laser material may be used in this case, for example Nd:YLF, Yb:YAG, and the like. The Q-switch for laser crystal 3 is provided with reference numeral 5, and the Q-switch of laser crystal 4 is provided with reference numeral 6. Laser crystal 3 together with Q-switch 5 and pump fiber 1 forms a first radiation source 7, and laser crystal 4 together with Q-switch 6 and pump fiber 2 forms a second radiation source 8. A focusing lens 9 is situated in the beam paths of both radiation sources 7, 8, so that the light from these radiation sources is bundled on a focal point 10. FIG. 4*b* shows one alternative exemplary embodiment in which the two laser crystals 3, 4 are designed as one piece to form a single laser crystal 11 which includes a shared Q-switch 12. Reference numerals 3 and 4 are therefore illustrated using dashed lines in FIG. 4*b*. Distance a between the two laser crystals provides a slight coupling in both modes. Except for the one-piece design of the two laser crystals and Q-switch, the design according to FIG. 4*b* otherwise corresponds to the exemplary embodiment of FIG. 4*a*.

Figure 4C:
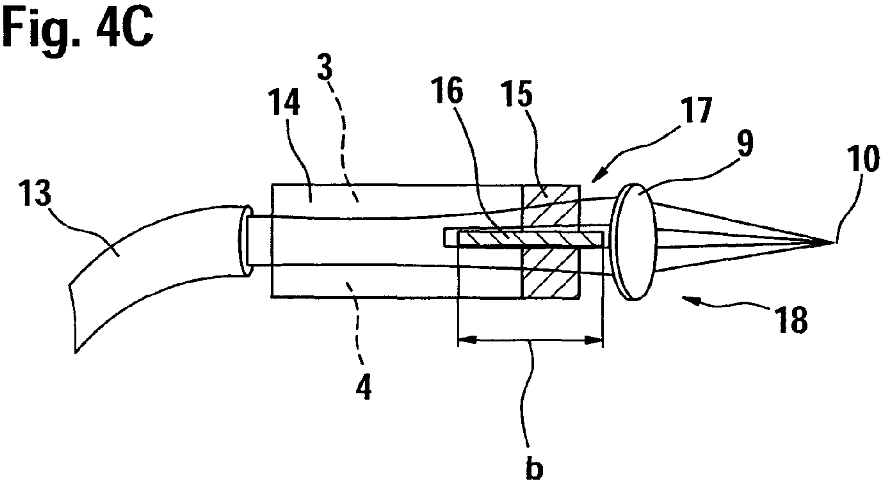

FIG. 4*c* shows a third exemplary embodiment, which includes a pump fiber 13 and a laser crystal 14 having a Q-switch 15, which are designed similarly to the previous exemplary embodiments. A screen 16 is provided on the side of laser crystal 14 or Q-switch 15 facing away from pump fiber 13. Screen 16 having length b extends in the longitudinal direction of laser crystal 14, i.e., in the direction in which laser beams are generated, and divides laser crystal 14 into two laser crystals 3, 4 as optical resonators, and thus into two radiation sources, which are provided with reference numerals 17 and 18, respectively. Here as well, a lens 9 focuses the two laser beams in a focal point 10.

Using the exemplary embodiments shown in FIGS. 4*a* through *c*, it is possible to generate the previously described multiple pulses in the nanosecond range, and thus more effectively design the entire ignition process of the internal combustion engine.

Figure 5:
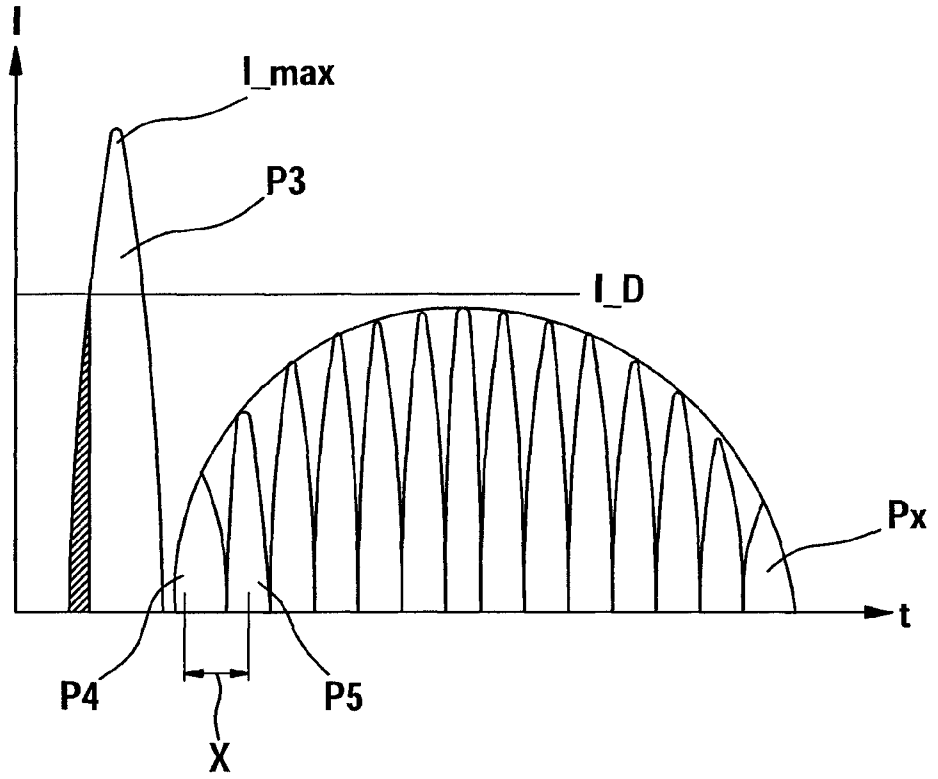
FIG. 5 shows a diagram of the radiation intensity over time for a third exemplary embodiment of a pulse sequence according to the present invention.

FIG. 5 shows a further exemplary embodiment of a method according to the present invention, illustrated as the intensity of laser light I over time t. In this exemplary embodiment, initially a first high-intensity, short laser pulse P3 is generated whose maximum intensity I_Max is above breakthrough intensity I_D. First laser pulse P3 is followed by a plurality of additional pulses P4 through Px, each having a maximum intensity which remains below breakthrough intensity I_D. Using first high-intensity laser pulse P3, a plasma having low energy and a steep pulse leading edge is generated. The generated plasma is then heated by subsequent laser pulses P4, . . . , Px, which are generated at a frequency in the megahertz range. Laser pulses P4, . . . , Px following first laser pulse P3 have a time interval X of 200 nanoseconds maximum. Time interval X is measured, for example, from the start of one pulse to the start of the subsequent pulse, or from the maximum intensity of one pulse to the maximum intensity of the subsequent pulse. Subsequent laser pulses P4 through Px may be, but do not have to be, above breakthrough intensity I_D, since a plasma has already been generated by pulse P3. One of the devices according to FIG. 4*a* through 4*c* may be used for carrying out the method according to FIG. 5. For an embodiment according to FIG. 4*a*, the laser for heating the plasma must have a very high pulse repetition rate. This may be achieved by the fact that the laser resonator of the laser for generating subsequent pulses P4 through Px is shorter than the laser for generating first pulse P3. The length of the laser resonator is ideally selected so that this length corresponds to the maximum absorption length of the active laser material. For this purpose the decoupling mirror may have a higher reflectivity, ideally greater than 70% to approximately 99%, and the passive Q-switch may have a higher initial transmission, ideally greater than 50%, up to 98%, and the pump intensity may be selected to be very high. In the embodiment according to FIG. 4*b* the pump intensity of the laser for heating the plasma should be higher than that of the plasma-generating laser.

Figure 6:
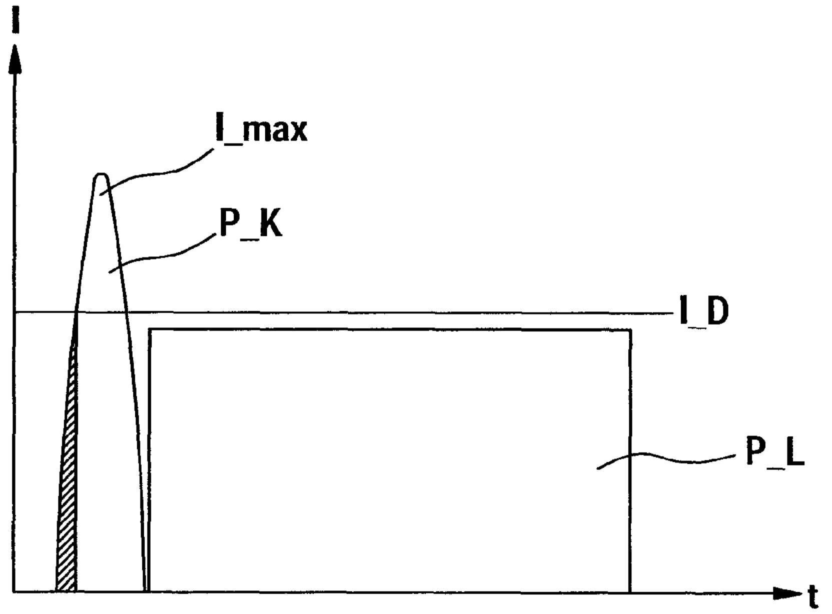
FIG. 6 shows a diagram of the radiation intensity over time for a fourth exemplary embodiment of a pulse sequence according to the present invention.
Figure 7A:
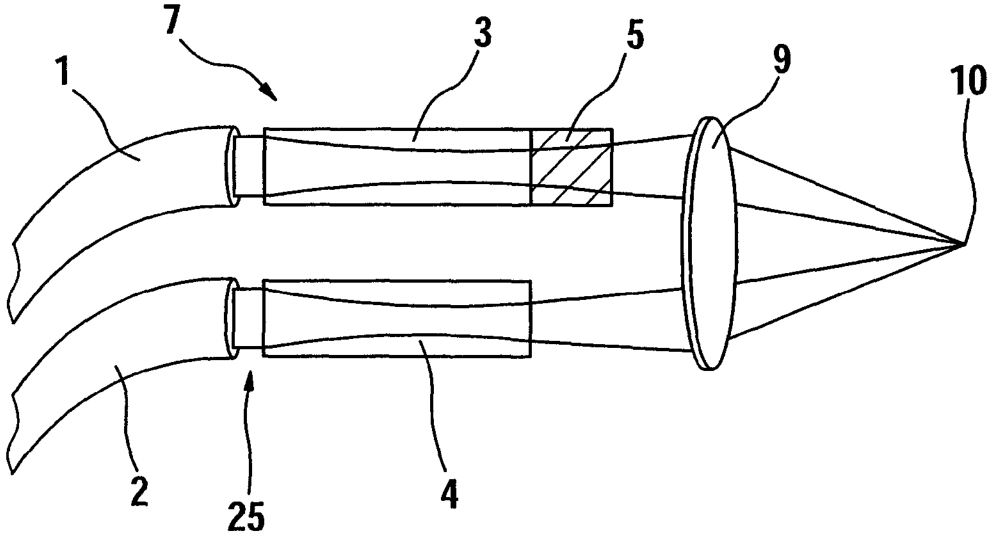
FIGS. 7*a* and 7*b* show exemplary embodiments of laser radiation sources according to the present invention.
Figure 7B:
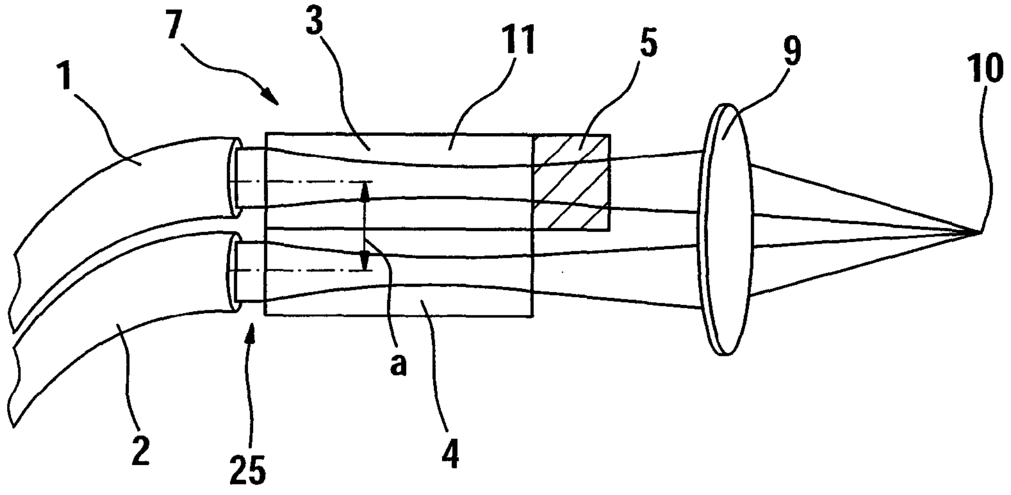

FIG. 6 shows a further exemplary embodiment of a method according to the present invention as a diagram of intensity I over time t, and FIG. 7 shows an exemplary embodiment of a laser according to the present invention as a device for carrying out the method. First, a short laser pulse P_K is generated which has a maximum intensity I_Max which is above breakthrough intensity I_D. Short pulse P_K is followed by a long pulse P_L whose maximum intensity may be, but does not have to be, below breakthrough intensity I_D. Second pulse P_L is a continuous-wave (cw) pulse which heats the plasma generated by short pulse P_K. A device for generating appropriate laser pulses is illustrated in FIG. 7. The embodiment according to FIG. 7*a* essentially corresponds to the embodiment according to FIG. 4*a*, except that a Q-switch, provided with reference numeral 6 in FIG. 4*a*, is omitted for the second laser radiation source, in this case provided with reference numeral 25. Here as well, laser crystal 3 together with Q-switch 5 and pump fiber 1 forms a first radiation source 7, and laser crystal 4 together with pump fiber 2 forms second radiation source 25. The embodiment according to FIG. 7*b* essentially corresponds to the embodiment according to FIG. 4*b*, and here as well the Q-switch is omitted for one of the two lasers. Laser crystal 11 together with Q-switch 5 and pump fiber 1 forms first radiation source 7, and laser crystal 11 together with pump fiber 2 forms second radiation source 25. In this manner continuous radiation is generated which heats the plasma using continuous-wave pulse P_L according to FIG. 6 after it is generated.

Figure 8:
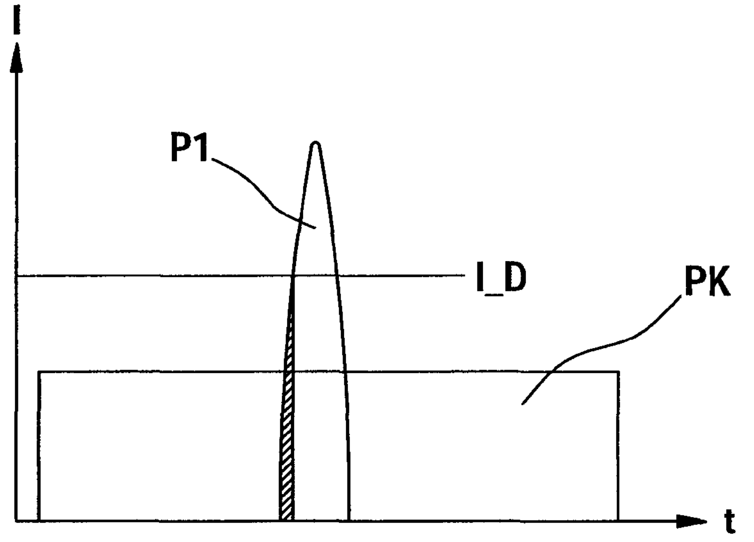
FIG. 8 shows a diagram of the radiation intensity over time for a fifth exemplary embodiment of a pulse sequence according to the present invention.
Figure 9:
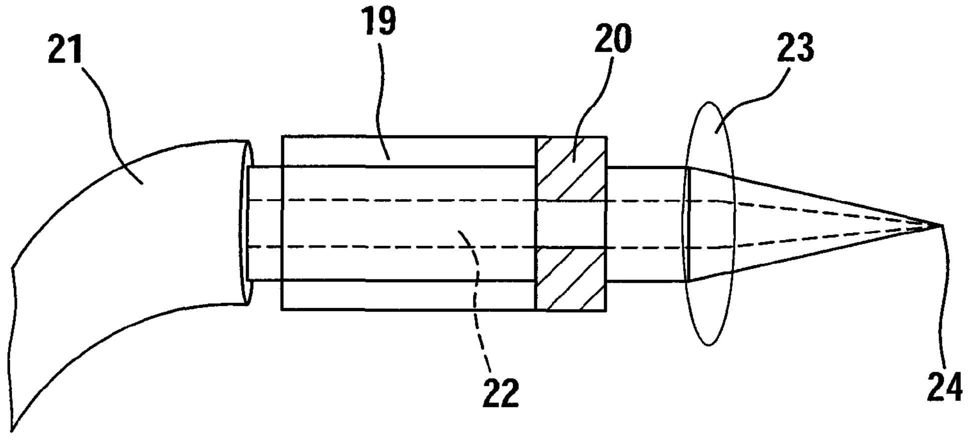
FIG. 9 shows one exemplary embodiment of a laser radiation source according to the present invention.

FIG. 8 shows a further exemplary embodiment of a method according to the present invention as a diagram of intensity I over time t, and FIG. 9 shows one exemplary embodiment of a laser according to the present invention for carrying out the method. In this exemplary embodiment a laser pulse P1 having a duration of 1 ns to 1 μs, which may be between 10 ns and 200 ns, is generated. Continuous radiation PK occurs in parallel with respect to time. Maximum intensity I_max of pulse P1 is above breakthrough intensity I_D, and the constant intensity of continuous radiation PK is below breakthrough intensity I_D. Laser pulse P1 is used for generating a plasma, and continuous radiation PK is used for the further heating of the plasma. Continuous radiation PK may, for example, be the pump radiation of the laser for generating laser pulse P1. In addition, before the plasma is generated by the pulse having intensity P1, PK may cause preionization of the focal volume, thereby contributing to easier generation of the plasma. FIG. 9 shows one exemplary embodiment of such a laser. This laser includes a laser crystal 19 as resonator, which on one side is provided with a passive Q-switch 20, and on the other side is provided with a pump fiber 21 which is connected to a laser diode (not illustrated) as an optical pump source. In this case laser crystal 19 and Q-switch 20 form a first radiation source 26 in the sense of the preceding exemplary embodiments. Q-switch 20 has a through opening 22 which allows radiation from the pump source to pass through through opening 22. Through opening 22 thus forms a second radiation source 27 which directly emits the pump radiation. A lens 23 is provided downstream from Q-switch 20 which focuses the laser radiation as well as the radiation from the pump source passing through laser crystal 19 on a focal point 24.

What is claimed is:

1. A device for igniting a fuel-air mixture in a combustion chamber of an internal combustion engine with the aid of electromagnetic radiation, which is light, comprising:

at least two laser radiation sources, each having an optical resonator, the resonators being spatially oriented with respect to one another so that modes of the laser radiation sources are coupled to one another and are able to generate time-shifted pulses of the electromagnetic radiation.

2. The device of claim 1, wherein the resonators are situated in a single laser crystal.

3. The device of claim 1, wherein the resonators are situated in laser crystals which are separated at a distance.

4. The device of claim 1, wherein the optical resonators are each connected to a separate pump unit.

5. The device of claim 1, wherein the optical resonators are connected to a shared pump unit.

6. The device of claim 1, wherein a screen is provided between the optical resonators.

7. The device of claim 1, wherein only one of the optical resonators is provided with a Q-switch.

8. The device of claim 1, wherein the radiation from the laser radiation sources is focused on a point by an optical element.

* * * * *